United States Patent [19]

Diaz

[11] Patent Number: 4,597,779
[45] Date of Patent: Jul. 1, 1986

[54] PROCESS FOR INHIBITING HYDRATES WHILE PRODUCING MOIST $CO_2$ FROM SUBTERRANEAN RESERVOIRS

[75] Inventor: Zaida Diaz, Houston, Tex.

[73] Assignee: Shell Oil Company, Houston, Tex.

[21] Appl. No.: 706,371

[22] Filed: Feb. 27, 1985

[51] Int. Cl.⁴ .............................................. B01D 53/14
[52] U.S. Cl. ........................................ 55/32; 166/267
[58] Field of Search ...................................... 55/29–32, 55/35, 34; 166/267

[56] References Cited

U.S. PATENT DOCUMENTS 3,495,380 2/1970 Reman et al. ............................ 55/32
3,676,981 7/1972 Afdahl et al. ............................ 55/32
4,235,289 11/1980 Weeter ................................. 166/267
4,478,612 10/1984 Diaz et al. ............................... 55/29

FOREIGN PATENT DOCUMENTS 0018268 8/1974 Japan ..................................... 55/32

Primary Examiner—Charles Hart

[57] ABSTRACT

In producing $CO_2$ from subterranean reservoirs at conditions apt to cause two-phase flow in pipes conveying the fluid, the formation of hydrates is prevented by adding a polyhydric alcohol hydrate inhibitor in proportions capable of maintaining an effective concentration within the aqueous liquid-phase in spite of partitioning of the inhibitor into a $CO_2$-rich liquid-phase of many times greater volume.

7 Claims, No Drawings

PROCESS FOR INHIBITING HYDRATES WHILE PRODUCING MOIST CO$_2$ FROM SUBTERRANEAN RESERVOIRS

BACKGROUND OF THE INVENTION

The present invention relates to producing CO$_2$ from subterranean reservoirs for use at high pressures. More particularly, the invention relates to an improved process for preventing hydrate formation in CO$_2$-containing fluids being flowed from the producing wells to a CO$_2$ dehydrating facility.

U.S. Pat. No. 4,235,289 describes the production of CO$_2$ from subterranean wells for use at high pressure and recommends that the CO$_2$ be maintained in a substantially single phase supercritical state; but also indicates that a hydrate inhibitor or drying agent, e.g. ethylene glycol may be added to prevent hydrate formation from damaging the gathering line.

U.S. Pat. No. 3,676,981 describes treatment of natural gas at superatmospheric pressure and states that, with respect to such hydrocarbon gases, glycols and methyl alcohol have been found to be "the most effective hydrate inhibitors".

U.S. Pat. No. 4,478,612 by Zaida Diaz and J. H. Miller describes a process for drying at least substantially supercritical CO$_2$ with glycerol and indicates that the anomalous solvency properties of CO$_2$ near or above its critical point are such that significant savings can be attained by using glycerol as the desiccant at a relatively low temperature in order to minimize the energy required for compressing the dry CO$_2$ for use at high pressure. The disclosures of U.S. Pat. No. 4,478,612 are incorporated herein by reference.

SUMMARY OF THE INVENTION

The present invention relates to improving a process in which moist CO$_2$ is produced at high pressure from a subterranean reservoir, is mixed with hydrate inhibitor and is piped to a treatment facility for drying the CO$_2$ to provide a product for use at high pressure. The present improvement comprises a combination of steps. The piping of the CO$_2$-containing mixture is conducted at pressure and temperature conditions which are apt to cause the formation of an aqueous liquid-phase mixed with a volume of a CO$_2$-rich liquid phase which is much greater than the volume of the aqueous liquid-phase. The CO$_2$ may be present as a liquid CO$_2$-rich phase only, or as a mixture of a liquid CO$_2$-rich phase and a vapor CO$_2$-rich phase. The moist CO$_2$ being piped is mixed with sufficient hydrate inhibitor to ensure that the concentration of inhibitor remaining in any aqueous liquid-phase which enters or is formed within the pipeline will be sufficient to prevent the forming of hydrates. The inhibitor used is a polyhydric alcohol hydrate inhibitor having a solubility in CO$_2$ which, at the pressure and temperature of the CO$_2$ in the pipe, is much lower than the solubility of a monohydric alcohol hydrate inhibitor such as methanol; in order to reduce the contamination of the CO$_2$ and the loss of the inhibitor due to its being partitioned into any CO$_2$-rich phase of the fluid in the pipe.

DESCRIPTION OF THE INVENTION

A typical subterranean reservoir from which CO$_2$ is produced may contain 98.2 percent CO$_2$, 1.6 percent nitrogen gas and 0.2 percent methane. Typical inlet and outlet conditions in the gathering system of pipes leading to a CO$_2$ drying facility are in the order of 700 psia, 50° F. and 550 psia, 32° F. respectively. At these conditions, the CO$_2$ stream exists as a mixture of liquid and vapor CO$_2$-rich phases. Such CO$_2$ is usually separated from any free water present at the inlet conditions, but it remains saturated with water throughout the line. Therefore, the pressure and temperature drop between inlet and outlet conditions results in the formation of a condensed aqueous phase in the line. Although it may be desirable to produce such CO$_2$ as a single phase supercritical fluid, in practice, numerous factors make it more desirable to operate at conditions which cause or are apt to cause the phase separation within the gathering system.

As indicated in the cross-referenced U.S. Pat. No. 4,478,612 patent, gaseous systems composed essentially of moist CO$_2$ at conditions of elevated temperatures and pressures at least approaching critical conditions exhibit relatively unpredictable solvency properties with various compounds. Applicant has now found that liquid CO$_2$-rich systems exhibit similar unpredictable solvency properties. Because of these properties, hydrate inhibitors such as methanol, which are effective in hydrocarbon systems, are unsuitable for CO$_2$ systems in which liquid CO$_2$-rich phases are apt to be present. Previous estimates of the amount of methanol needed for hydrate inhibition were extrapolated from data involving a CO$_2$-phase having a volume of only about 1/10th of the volume of the aqueous phase. For this composition, the methanol loss in the liquid CO$_2$ phase is insignificant. However, these estimates are inapplicable to conditions such as those anticipated in field-scale production of CO$_2$, where the volume of CO$_2$ may be several hundred times larger than the volume of the aqueous phase. At these field conditions, the loss of methanol into the liquid CO$_2$-rich phase is very significant. It has now been found that in the order of about 180 pounds of methanol per mmscf of CO$_2$ would be required to prevent hydrate formation at the typical gathering system conditions mentioned above.

Inhibitor requirements depend on two factors: the concentration of inhibitor needed in the aqueous liquid phase to suppress hydrate formation, and the solubility of the inhibitor in the liquid CO$_2$-rich phase. A computer program known as the CSMHYD program (which was published in 1983 by D. D. Erickson in a MS thesis "Development of a Natural Gas Hydrate Prediction Program", Colorado School of Mines, Golden, Colo., 1983) was utilized to estimate the amount of monohydric and polyhydric alcohol hydrate inhibitors which would be required in the water-phase for various conditions of temperature, pressure, and components of produced CO$_2$.

Experimental solubility data were used to model the monohydric and polyhydric alcohol-CO$_2$-water equilibria, and to predict the losses of the alcohol inhibitor into the liquid CO$_2$-rich phase. Total inhibitor requirements were then estimated by adding the water-phase inhibitor requirements to the inhibitor losses in the CO$_2$ phase. For the previously mentioned typical gathering system conditions for CO$_2$ produced from subterranean reservoirs, it was found that the total requirements for diethylene glycol (DEG) would be only about 19 rather than 180 pounds per mmscf CO$_2$. And, of the required 19 pounds, about 5 ppmscf will dissolve in the condensed water phase and prevent hydrate formation, with about 14 ppmscf ending up dissolved in the liquid $CO_2$ phase.

In view of the uncertainties involved in such estimates, a field test program was initiated. This testing required that a well be completed and operated in a reservoir in the McElmo field at a depth of approximately 8,000 feet. The well was operated to produce a fluid composed of about 98% $CO_2$ (with the remainder being nitrogen, hydrocarbon gases and water) at a rate of about 4 to 8 mmscf per day at pressures of 900 to 1000 psia and temperatures of 70° to 80° F.

A portable well test facility was utilized to measure the effects of various hydrate inhibitors. The produced fluid was flowed through a horizontal separator for removing the bulk of the produced water and providing separate streams of liquid and vapor $CO_2$. The hydrate inhibitors being tested were injected into the liquid $CO_2$ stream. The streams were combined and the resulting fluid was flowed through the coils of a heater (which was not fired) and then through a strainer, around which a bypass was arranged. Pressure measurements across the strainer and visual observations were employed to determine whether or not hydrates were formed. The flow rate of the $CO_2$ vapor and liquid streams, the conditions of pressure and temperature at the strainer, the inhibitors used, the rate of inhibitor addition, and the effective inhibitor dosage rate in pounds per mmscf as well as answers to the question of whether or not hydrates were formed, are reported in Table 1.

TABLE 1

| $CO_2$ flow (MMSCF) | | Conditions at Strainer | | | Inhibitor Solution Injection Rate | Effective Inhibitor Dosage | Hydrates |
|---|---|---|---|---|---|---|---|
| Vapor | Liquid | P(psig) | T(°F.) | Inhibitor | (gal/MMSCF) | (lb/MMSCF) | Formed |
| 4.49 | 2.86 | 630 | 43 | Methanol | 8.1 | 54 | Yes |
| 4.49 | 2.80 | 600 | 41 | Methanol | 10–11.4 | 67–76 | No |
| 1.9 | 3.9 | 585 | 39 | DEG | 0.85 | 8 | No |
| 2.1 | 4.4 | 590 | 39.5 | Glycerol[1][2] | 0.35 | 1.8 | No |
| 2.0 | 4.3 | 595–605 | 40–41 | Glycerol[1] | 3.6 | 19 | No |
| 4.43 | 2.82 | 510 | 30.5 | Methanol | 17.8 | 119 | Yes |
| 4.48 | 2.82 | 520 | 31 | Methanol | 19.5 | 131 | No |
| 1.9 | 3.9 | 530 | 31 | DEG | 3.0 | 28 | No |
| 3.4 | 2.6 | 510 | 29.5 | Glycerol[1] | 6.3 | 33 | No |

[1] Glycerol injected as a solution containing 50% v Glycerol and 50% v $H_2O$.
[2] Data from this test may be questionable.

As indicated in the Table, in a system such as the test system, in which the volume of liquid $CO_2$ is many times (e.g. in the order of 500 times) as large as that of the condensed water-phase, the large proportion of a monohydric alcohol hydrate inhibitor, such as methanol, which is needed, would be prohibitively expensive.

Applicant has discovered unpredictable advantages for using a particular combination of steps for producing $CO_2$ from a subterranean reservoir at conditions in which a liquid $CO_2$-rich phase is or is apt to become present (such as a pressure of at least about 500 psia and a temperature near the ambient temperature at the wellhead) where the produced $CO_2$ is piped into and dried at a central facility for supplying $CO_2$ for use at high pressure. The combination of steps comprises: (a) producing the $CO_2$ and piping it to the central facility at conditions at which both an aqueous liquid-phase and a $CO_2$-rich liquid-phase are apt to be present in the gathering system, (b) using a polyhydric alcohol hydrate inhibitor rather than a monohydric alcohol hydrate inhibitor and (c) adding the inhibitor to the fluid being piped in a proportion sufficient to maintain in the aqueous liquid-phase, which is or is apt to become present, a concentration of inhibitor capable of preventing hydrate formation in spite of the partitioning of inhibitor into a $CO_2$-rich liquid-phase having a volume many times larger than the volume of the aqueous liquid-phase.

A particularly advantageous process comprises using glycerol as both the hydrate inhibitor and the $CO_2$-drying desiccant. This enables the $CO_2$-production system to employ a single regenerator for the compounds providing both of these functions. Applicant has discovered that where the glycerol is to be used as a hydrate inhibitor at a relatively low temperature, its rather high viscosity can suitably be reduced by dilution with water without undue loss of hydrate inhibiting efficiency.

Although ethylene glycol is a particularly attractive hydrate inhibitor, it becomes thermally unstable at a temperature significantly less than glycerol. However, ethylene glycol is attractive for use where a separate hydrate inhibotor regeneration facility is provided.

1. In a $CO_2$-producing process in which moist $CO_2$ is produced at high pressure from a subterranean well, is mixed with a hydrate inhibitor and is piped to a facility for drying $CO_2$ and subsequently supplying it for use at high pressure, an improvement for avoiding the need for producing and piiping the $CO_2$ at pressures and temperatures maintaining a single phase state comprising:

conducting said producing and piping of moist $CO_2$ at pressure and temperature conditions of at least about 500 psia but less than critical conditions and the ambient temperature near the wellhead apt to convert the fluid being piped to a fluid containing both an aqueous liquid-phase and a $CO_2$-rich liquid-phase having a volume which is many times greater than that of the aqueous liquid-phase;

mixing the so produced moist $CO_2$ with sufficient hydrate inhibitor to cause the concentration remaining in said aqueous phase to be sufficient to prevent hydrate formation in spite of the amount of inhibitor which will be partitioned into said $CO_2$-phase; and using as said hydrate inhibitor a polyhydric alcohol hydrate inhibitor having a solubility in $CO_2$ at the conditions in the pipe which is low relative to the solubility of methanol in that $CO_2$, so that, while simplifying the producing and piping operations, both the contamination of $CO_2$ and loss of inhibitor are minimized.

2. The process of claim 1 in which a significant fraction of the $CO_2$ being piped is present as a $CO_2$-rich liquid-phase.

3. The process of claim 1 in which the pressure of the $CO_2$ being piped is greater than about 500 psi.

4. The process of claim 1 in which a significant proportion of water is removed from the produced $CO_2$-containing fluid before the inhibitor is added.

5. The process of claim 1 in which the inhibitor is a compound of the group ethylene glycol, diethylene glycol and glycerol.

6. The process of claim 5 in which the inhibitor is a compound of the group diethylene glycol and glycerol and the drying agent utilized for dehydrating the $CO_2$ in the dehydration facility contains reconstituted portions of the same compound used as the hydrate inhibitor for the $CO_2$.

7. The process of claim 6 in which the hydrate inhibitor is glycerol.

* * * * *